United States Patent
Neufeld

(10) Patent No.: US 11,475,252 B2
(45) Date of Patent: Oct. 18, 2022

(54) SYSTEMS AND TECHNIQUES TO MONITOR TEXT DATA QUALITY

(71) Applicant: Capital One Services, LLC, McLean, VA (US)

(72) Inventor: Robin Astrid Epp Neufeld, Toronto (CA)

(73) Assignee: Capital One Services, LLC

( * ) Notice: Subject to any disclaimer, the term of this patent is extended or adjusted under 35 U.S.C. 154(b) by 549 days.

(21) Appl. No.: 16/601,660

(22) Filed: Oct. 15, 2019

(65) Prior Publication Data
US 2020/0356824 A1   Nov. 12, 2020

Related U.S. Application Data

(62) Division of application No. 16/406,848, filed on May 8, 2019, now Pat. No. 11,048,984.

(51) Int. Cl.
| | |
|---|---|
| *G06F 11/30* | (2006.01) |
| *G06K 9/62* | (2022.01) |
| *G06N 20/00* | (2019.01) |
| *G06N 3/08* | (2006.01) |
| *G06V 30/148* | (2022.01) |
| *G06V 30/10* | (2022.01) |

(52) U.S. Cl.
CPC ............ *G06K 9/6269* (2013.01); *G06N 3/08* (2013.01); *G06N 20/00* (2019.01); *G06V 30/153* (2022.01); *G06V 30/10* (2022.01)

(58) Field of Classification Search
CPC .................................................... G06K 9/6269
See application file for complete search history.

(56) References Cited

U.S. PATENT DOCUMENTS

| | | | |
|---|---|---|---|
| 7,707,129 B2* | 4/2010 | Zhuang ................. | G06F 16/353 706/20 |
| 2012/0102002 A1* | 4/2012 | Sathyanarayana .... | G06F 16/215 707/687 |
| 2020/0210442 A1* | 7/2020 | Bergeron .............. | G06F 16/254 |

* cited by examiner

*Primary Examiner* — Phuong Huynh
(74) *Attorney, Agent, or Firm* — KDB

(57) ABSTRACT

Disclosed are a system, apparatus and techniques for evaluating a dataset to confirm that the data in the dataset satisfies a data quality metric. A machine learning engine or the like may evaluate text strings within the dataset may be of arbitrary length and encoded according to an encoding standard. Data vectors of a preset length may be generated from the evaluated text strings using various techniques. Each data vector may be representative of the content of the text string and a category may be assigned to the respective data vector. The category assigned to each data vectors may be evaluated with respect to other data vectors in the dataset to determine compliance with a quality metric. In the case that a number of data vectors fail to meet a predetermined quality metric, an alert may be generated to mitigate any system errors that may result from unsatisfactory data quality.

20 Claims, 6 Drawing Sheets

410 — RECEIVE A DATASET WITH A NUMBER OF VARIABLE LENGTH CHARACTER STRINGS

420 — OBTAIN A RESPECTIVE VARIABLE LENGTH STRING FROM THE NUMBER OF VARIABLE LENGTH STRINGS

430 — COMPUTE A NUMBER OF FEATURES OF THE RESPECTIVE VARIABLE LENGTH CHARACTER STRING

440 — CAPTURE ATTRIBUTES OF THE RESPECTIVE VARIABLE LENGTH CHARACTER STRING BASED ON THE NUMBER OF COMPUTED FEATURES

450 — POPULATE A DATA VECTOR WITH THE CAPTURED ATTRIBUTES

460 — LAST VARIABLE LENGTH STRING IN DATASET?

465 — NO — OBTAIN NEXT RESPECTIVE VARIABLE LENGTH STRING

YES

470 — ASSIGN A CATEGORY TO EACH RESPECTIVE DATA VECTOR USING A MACHINE LEARNING ALGORITHM

480 — EVALUATE THE DATASET BASED ON THE CATEGORY ASSIGNED TO EACH RESPECTIVE DATA VECTOR

490 — IN RESPONSE TO A RESULT OF THE CATEGORY ASSIGNED TO EACH RESPECTIVE DATA VECTOR, DETERMINING WHETHER THE DATASET SATISFIES A DATA QUALITY METRIC

SYSTEMS AND TECHNIQUES TO MONITOR TEXT DATA QUALITY

CROSS-REFERENCE TO RELATED APPLICATION

This application is a divisional application of U.S. patent application Ser. No. 16/406,848 filed on May 8, 2019, the entire contents of which are incorporated herein by reference.

BACKGROUND

Computer systems are very dependent on the quality of the data input into the system. The old adage of "Garbage In =Garbage Out," holds true from the day it was coined to today. In particular, today's systems are very automated and at times have rigid data requirements. When the inputted data deviates from those data requirements, there may be software "crashes" or other unintended consequences, such as a poor customer service decision, a credit decision, a customs agent error, Social Security benefit error, or the like.

While numerical data typically have well-defined metrics for ensuring that the numerical data complies with the data quality requirements, text data does not have such clear metrics. A human may easily notice whether an address of a residence or a business is valid or not; an automated process has difficulty determining the validity of an address. There are numerous other examples of text data that is not easily classified as valid or invalid.

Without being able to properly classify text data, it is extremely difficult to determine whether the inputted text data satisfies data quality metrics. Different techniques have been applied to determining a class of text data. For example, different string distance measurement techniques have been applied, such as a Levenshtein distance. However, some of these distance measurements may tend to be too fine-grained and for large datasets with unique, yet similarly structured data (such as street addresses), every single pair of inputs would have the maximum possible Levenshtein distance from each other, and it would be impossible to build useful monitoring and analysis using it.

Other methods may use supervised learning, which requires training on a large corpus of example data as well as preprocessing of the input text into some fixed-sized format. The example data may be correctly labeled, which requires manually checked and also requires a large volume of historical data. As a result, it becomes difficult to apply these techniques to new areas.

It would be helpful if a system and technique were available to properly classify text strings of a dataset and evaluate the text string classifications to determine whether the dataset satisfies a data quality metric. By being able to quickly determine that a dataset does or does not contain high-quality data, steps to ensure that the data may be properly processed by the system may be taken, thereby avoiding software crashes or making erroneous decisions based on the data.

SUMMARY

Disclosed is an example of a method that includes identifying a number of text strings in a dataset. Each respective text string may have an arbitrary length and may be encoded according to an encoding standard. A data vector may be generated for each respective text string. The generated data vector may have a preset data length and may include feature data indicating features of the respective text string. A respective data vector category may be determined for each respective data vector. The data vector category may be based on the feature data included in each respective data vector. Each respective data vector may be assigned to the respective category determined for the respective data vector. The dataset may be evaluated based on each respective data vector category. In response to a result of the evaluation of the dataset, it is may be determined whether the dataset satisfies a data quality metric.

A system is disclosed is a system including a data source, at least one database, and a data quality monitoring component. The data source may output a dataset related to a service, and that includes a number of text strings of arbitrary length and that are encoded according to an encoding standard. The at least one database may be coupled to the data source and operable to store the dataset output by the data source. The data quality monitoring component may be coupled to the data source and operable to perform functions. The functions performed by the data quality monitoring component may include receiving the dataset including the number of text strings of arbitrary length from the data source. A data vector may be generated for each respective text string of the plurality of text strings. The generated data vector may have a preset data length and includes feature data indicating features of the respective text string. A respective data vector category may be determined for each respective data vector. A category is based on the feature data included in each respective data vector. The dataset may be evaluated based on each respective data vector category. The data quality monitoring component may, in response to evaluating the dataset, determine whether the dataset satisfies a data quality metric.

An example of non-transitory computer readable medium embodying programming code is also disclosed. The embodied programming code, when executed by a processor, causes the processor to perform functions. The functions include receiving a dataset with a plurality of variable length character strings. For each respective variable length character string in the plurality of variable length character strings, the processor, when executing the programming code, may compute a number of features of the respective variable length character string. Attributes of the respective variable length character string may be captured based on the number of computed features. A data vector may be populated with the captured attributes. The data vector has a predetermined length and includes one or more of the captured attributes of the respective variable length character string. A category may be assigned to each respective data vector using a machine learning algorithm. Based on the category assigned to each respective data vector, the dataset is evaluated. In response to evaluating the dataset, it is determined whether the dataset satisfies a data quality metric.

BRIEF DESCRIPTION OF THE DRAWINGS

FIG. 4 illustrates a flow chart of another example of a process for processing and evaluating a quality of a monitored dataset.

DETAILED DESCRIPTION

Figure 1:
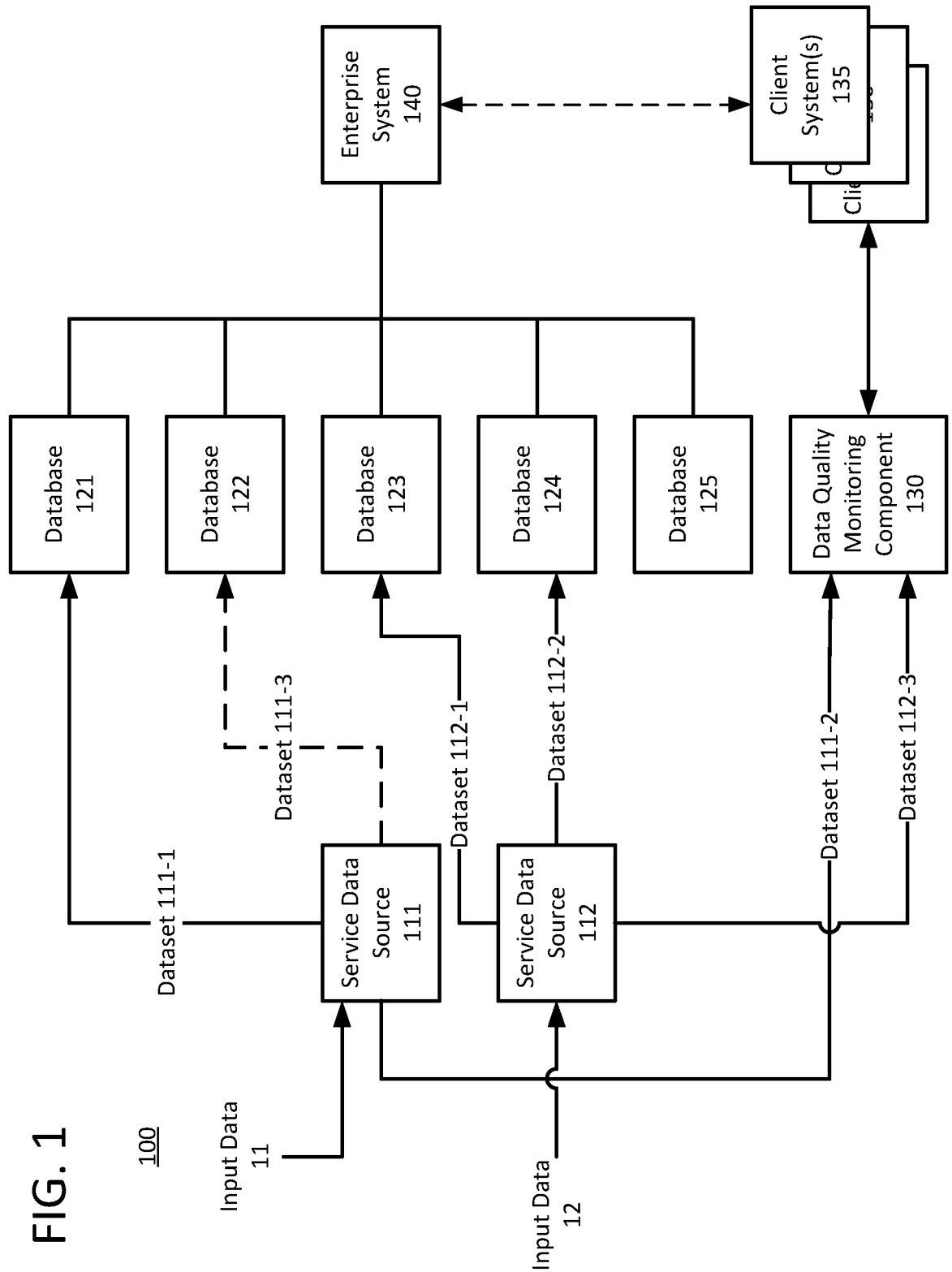
FIG. 1 illustrates an example of an implementation of a system for monitoring data quality as described herein.

Various examples are generally directed to a system, apparatus, and techniques for evaluating a dataset to confirm that the data in the dataset satisfies a data quality metric. A machine learning engine or the like may evaluate text strings within the dataset may be of arbitrary length and encoded according to an encoding standard. The text strings may include alphanumeric characters such as Latin or Roman alphabet letters, Arabic numbers (or simply, numbers), punctuation marks, special characters (such as @, &, * or the like), spaces, etc. Data vectors of a preset and common length may be generated from the evaluated text strings using various techniques. Each data vector may be representative of the content of the text string, and a category may be assigned to the respective data vector. The category assigned to each data vectors may be evaluated with respect to other data vectors in the dataset to determine compliance with a quality metric. In the case that a number of data vectors fail to meet a predetermined quality metric, an alert may be generated to mitigate any system errors that may result from unsatisfactory data.

Large enterprises often receive large qualities of documents (physical as well as electronic) that include text. For example, some financial institutions provide credit card services, banking services, loan services, and investment services (e.g., retirement services and/or products, such as loans, life insurance, or the like) based on the text information included in the received documents. Other types of enterprises may provide affinity services, such as rewards at retailers, gasoline, groceries, or the like, home improvement services, household products (e.g., paint, doors, furnishings, cleaning supplies, or the like), tool rental or other services provided by different organizations within the respective enterprise. Therefore, it is beneficial if the received text data is of the correct format, or even if in the correct format, that the data means what is intended to mean. For example, an address may be a mix of alphanumeric text characters, such as "92 Lake Street" or "A-55 Sunset Blvd." While such addresses seem to be accurately formatted, it may be difficult for a computer to determine that a text string of "N2X 3A1" is not a correct address, even though the text string has a mix of alphanumeric text characters. The systems, apparatus, components, and techniques described herein address the foregoing needs and provides advantages and improvements, such as mitigation of data-related software crashes due to poor data quality, and a data monitoring system and technique that enables an efficient determination of data quality.

Reference is now made to the drawings, wherein like reference numerals are used to refer to like elements throughout. In the following description, for purpose of explanation, numerous specific details are set forth in order to provide a thorough understanding thereof. It may be evident, however, that the novel examples can be practiced without these specific details. In other instances, well-known structures and devices are shown in block diagram form to facilitate a description thereof. The intention is to cover all modification, equivalents, and alternatives within the scope of the claims.

FIG. 1 is an example of an implementation of a system for monitoring data quality. An enterprise may be a commercial, governmental, or another type of entity that interacts with and provides services to users (i.e., clients or customers). The enterprise may receive a large number of documents containing text data. For example, system 100 may be implemented by an enterprise to provide services to clients or customers.

The system 100 may receive input data, such as 11 and 12, that contains text data made of alphanumeric characters. For example, the text data may be customer address information, email address information, password or username information, or similar data that is made up of alphanumeric characters. The input data 11 or 12 may be provided to one or more services provided by the enterprise. For example, an enterprise may be a financial institution that provides loans, bank accounts, credit cards, and other services to customers. The provisioning of the loans, bank accounts, credit cards, and other services to customers is done using service computer applications or functions that may be related individually to each respective service or may provide multiple respective services. A service computer application or function may, in order to provide the respective service, have to receive data from multiple sources of data, such as a data from a customer who desires the service, public/private institutions (e.g., credit bureaus, public records or the like), other systems or services within the enterprise providing the service, or the like. Service data sources 111 and 112 may send data, for example, as a dataset, that the particular service (e.g., data extracted from auto loan information) uses for providing a respective service (e.g., auto loan qualification) to one or more databases 121-125 for storage. The databases 121-125 may store different forms of data, e.g., customer name, customer street address information, financial information, notations regarding interactions with a particular customer, public record information or the like. Of course, the data may be encrypted for security. For example, databases 121-124 may store customer address information, email information or similar alphanumeric data, while database 125 may store financial data or account number data that is in numerical format. In addition, the alphanumeric data and numerical data may be further broken down such that the input data 11 or 12 may be stored in one or more of the databases 121-124.

The one or more databases 121-125 may be coupled to an enterprise system 140. The enterprise system 140 may use the data stored in the one or more databases 121-125 to operate systems that provide services to customers and also make decisions related to services to be provided to respective customers of the enterprise hosting the enterprise systems. Hence, the quality of the data provided by the respective data sources 111 and 112 needs to be of high quality. The present examples provide improved data quality monitoring to enable systems and agents via client system(s) 135 to more effectively alert the enterprise to data having a poor quality that may adversely affect the enterprise system 140.

The service data source 111 and service data source 112 may supply multiple copies of the datasets to the databases 121-124. Each of the data sources 111 and 112, outputs a dataset related to a service. In some examples, a dataset, such as 111-1, 111-2 and 111-3 that contain identical data, may include a number of text strings of arbitrary length that are encoded according to an encoding standard (e.g., Unicode, ASCII or the like) and may be formatted as comma-separated values (CSV), JavaScript Object Notation (JSON), or another data format. In an alternative, the system 100 may be compatible with a process in which a service data source, such as 111, directly inserts a dataset, such as 111-1, into a database, such as 121, using a database query/statement (i.e., the data may not be saved on disk in any intermediate step). For example, service data source 111 may provide dataset 111-1 to database 121, dataset 111-2 to the data quality monitoring component 130, and optionally, dataset 111-3 to database 122. Each of the datasets 111-1, 111-2, and 111-3 contain identical data and may be considered identical copies of one another. The service data source 112 may also output datasets 112-1, 112-2 and 112-3. The respective datasets 112-1 and 112-2 contain the same data and may be provided to databases 123 and 124. In addition, a dataset 112-3, which also contains the same data as datasets 112-1 and 112-2, may be provided to the data quality monitoring component 130. The respective datasets 112-1, 112-2 and 112-3 may be considered identical copies of one another.

The data quality monitoring component 130 may be operable either as an apparatus or as programming code executed by a processor or processor(s) to process and evaluate the datasets 111-2 and 112-3 to determine the quality of data in each of the respective datasets 111-2 and 112-3. The data quality monitoring component 130, upon completing the processing and evaluation of the respective datasets 111-2 and 112-3, may generate a result of the evaluation that is provided to the client system(s) 135 for further processing. For example, the quality of the data within one or both of datasets 111-2 and 112-3 may be determined to be below a data quality threshold by the data quality monitoring component 130. In response to the determination the data is below the data quality threshold, the data quality monitoring component 130 may be operable to send an alert to one or more of the client system(s) 135. Alternatively, if the quality of the data is above the data quality threshold, the data quality monitoring component 130 may not take any further action with regard to the evaluated datasets 111-2 and 112-3. The data quality monitoring component 130 may wait for another dataset or datasets to be received for data quality processing and evaluation.

Figure 2:
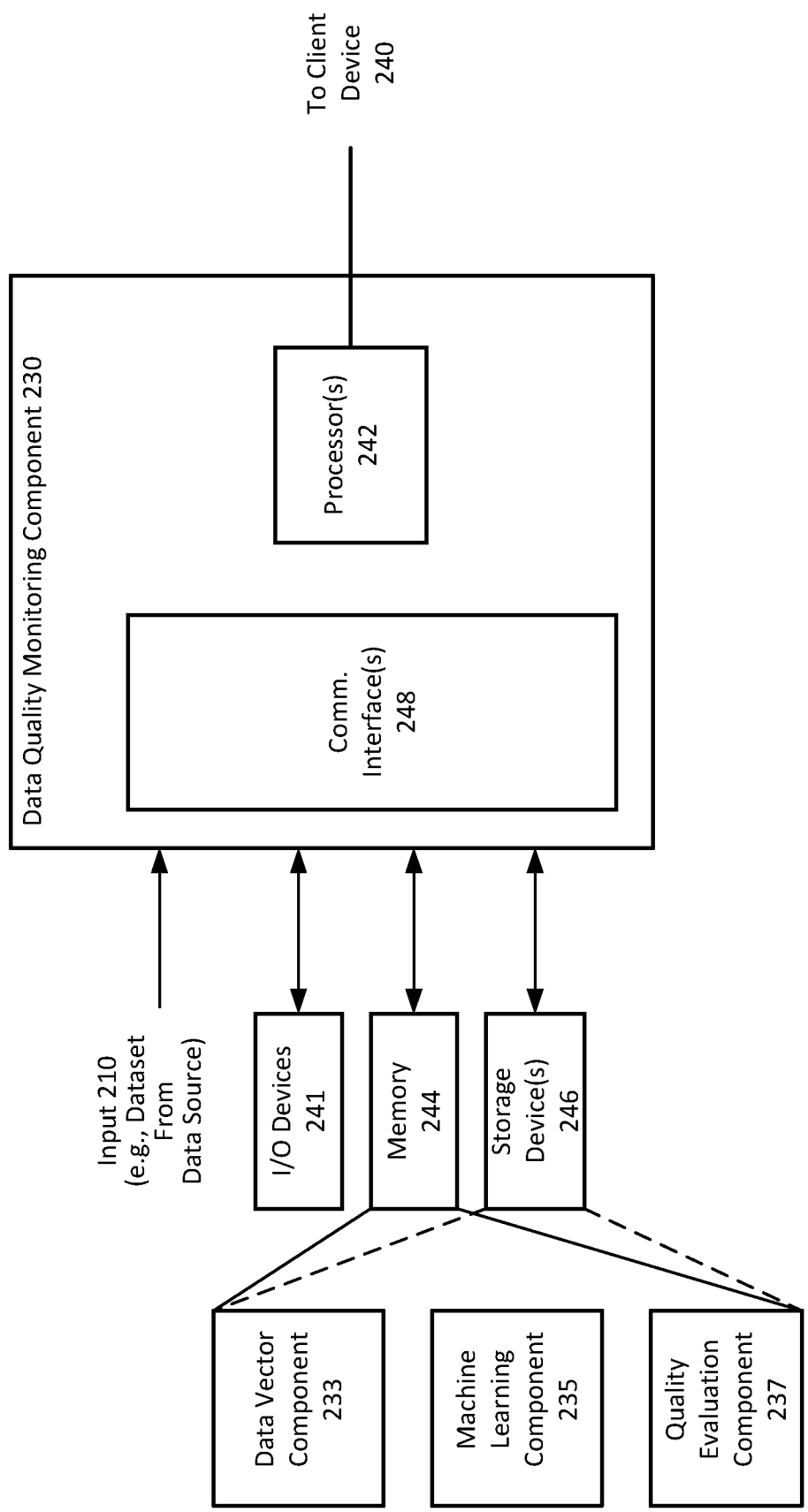
FIG. 2 illustrates an example of an apparatus operable to provide process functions that enable processing and evaluation of datasets to determine the quality of the data.

It may be helpful to discuss the details and functions performed by the data quality monitoring component in more detail. FIG. 2 illustrates an example of an apparatus operable to execute functions that enable processing and evaluation of datasets to determine the quality of the data.

The data quality monitoring apparatus includes a number of components that may perform one or more operations as discussed herein. The data quality monitoring apparatus 200 includes one or more processor(s) 242, memory 244, one or more storage device(s) 246, one or more communication interface(s) 248, and one or more input/output (I/O) device (s) 241. The one or more processor(s) 242 and communication interface(s) 248 may be integrated as part of a data quality monitoring component 230. In examples of the data quality monitoring apparatus 200, the data quality monitoring component 230 may be a processing system that includes one or more servers or computing devices that are interconnected via one or more network links, e.g., wired, wireless, fiber, etc. In some instances, the data quality monitoring apparatus 200 may be a distributed computing system. Each of the one or more servers or computing devices may include one or more processor(s) 242, which may include one or more processing cores to process information and data. Moreover, the one or more processor(s) 242 can include one or more processing devices, such as a microprocessor manufactured by Intel™, AMD™, or any of various processors. The disclosed examples are not limited to any type of processor(s).

The data quality monitoring apparatus 200 may include one or more communication interface(s) 248 that may include one or more digital and/or analog communication devices, network adapters and/or modems that allow the data quality monitoring apparatus 200 to communicate with other machines and devices. The one or more communication interface(s) 248 can communicate via any type of connection, e.g., wired, wireless, optical, and so forth. Examples are not limited in this manner.

The data quality monitoring apparatus 200 may also include one or more I/O devices 241, such as a mouse, keyboard, camera, microphone, etc. Other I/O devices may include USB devices, CD/DVD/Blu-ray devices, SD card devices, display devices, and so forth.

Memory 244 can include one or more memory (volatile or non-volatile) devices configured to store instructions used by the one or more processor(s) 242 to perform one or more operations consistent with the disclosed examples. For example, memory 244 can be configured with one or more software instructions, such as programs that can perform one or more operations when executed by the one or more processor(s) 242.

The disclosed example is not limited to separate programs or computers configured to perform dedicated tasks. For example, memory 244 can include a single program that performs the operations as described in the disclosed examples or could comprise multiple programs. Memory 244 can also store data that can reflect any type of information in any format that the system can use to perform operations consistent with the disclosed examples.

The storage device(s) 246 may include HDDs, flash memory devices, optical storage devices, floppy storage devices, etc. In some instances, the storage device(s) 246, may include cloud-based storage devices that may be accessed via a network interface. In some examples, the storage device(s) 246 may be configured to store one or more databases and/or as a distributed database system to store information and data. Databases can include one or more memory devices that store information and are accessed and/or managed through the respective apparatus, i.e., data quality monitoring apparatus 200. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed examples, however, are not limited to separate databases.

In one aspect, the storage device(s) 246 may be located remotely from the data quality monitoring apparatus 200. The storage device(s) 246 can include computing components (e.g., database management system, database server, etc.) configured to receive and process requests for data stored in memory devices of databases and to provide data from databases.

In addition, either the memory 244 or, optionally, the storage devices(s) 246 For example, the storage devices(s) 246 may store components, such as a data vector component 233, a machine learning component 235 and a quality evaluation component 237. The respective components, 233, 235 and 237 that perform various functions related to the described examples.

Figure 3:
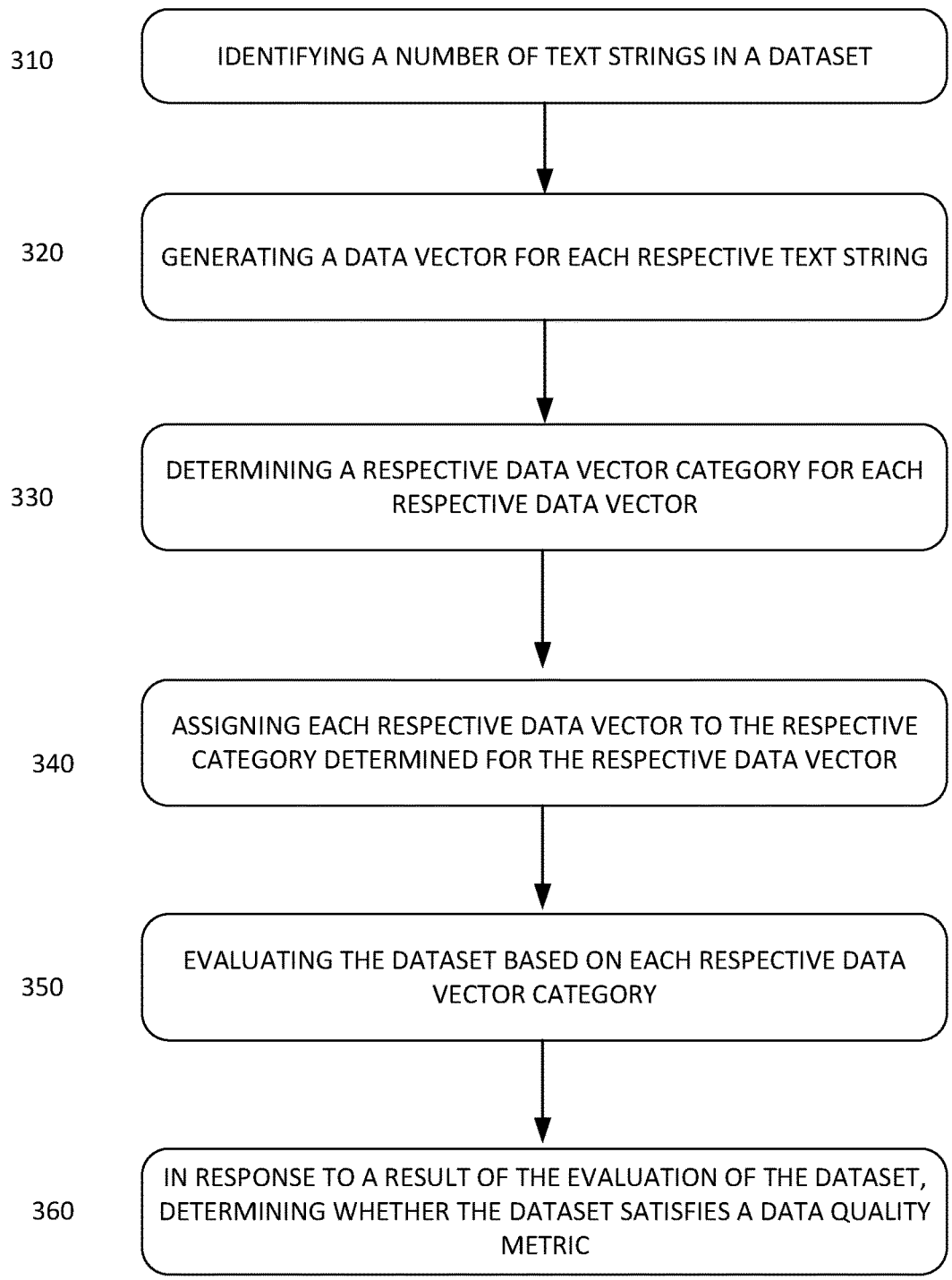
FIG. 3 shows a flow chart of an example process for processing and evaluating the data quality of a monitored dataset.

It may be helpful to describe an operational example of the data quality monitoring apparatus 200 with reference to FIG. 3. FIG. 3 shows a flow chart of an example process for processing and evaluating the data quality of a monitored dataset.

The data quality monitoring component 230 may include one or inputs, represented by input 210, from the data quality monitoring component 230 receives a dataset to a data source, such as 111 or 112. In an operational example, the data quality monitoring component 230 may perform a process 300 that includes receiving, via the input 210 and communication interface(s) 248, a dataset that includes a number of text strings of arbitrary length that may be encoded according to an encoding standard from the data source. In some examples, the text strings may already be identified and arranged in the dataset. Alternatively, the dataset may be unformatted meaning the text data is provided a batch of text without the text strings identified, and a component, such as the data vector component 233, may have to process the dataset to identify the text strings. The processor(s) 242 may provide the dataset to the data vector component 233, which identifies a number of text strings in the received dataset (310). The data vector component 233 may identify the text strings at 310 using, for example, one or more processes. In an example of a process used in step 310 to identify a number of the text strings, the data quality monitoring component 230, or, more specifically, the data vector component 233, may identify features of the alphanumeric characters that make up and are in the respective text string by identifying occurrences in the text string where a letter is adjacent to a number, a number is adjacent to a letter, a letter is surrounded by letters of a different type, triplets of a data element of the same type, or two numbers or letters of the same type are adjacent to letters, numbers of a different type, or the like. A type of letter or number may be an upper-case letter, a lower-case letter, a Latin character, an Arabic character, or the like. In addition, the system may also process characters from Asian languages, such as Japanese, Chinese, Korean, emojis, mathematical symbols, or the like.

At 320, a data vector may be generated for each respective text string of a number of text strings. In an example, each data vector may be a preset data length regardless of the arbitrary length of the text string, and each data vector may have feature data that indicates features of the respective text string. For example, features of the alphanumeric characters identified in the respective text string may be based on aspects of the encoding of the respective text string. Aspects of the encoding may include using codes from the encoding to differentiate different text as well as processing of the encoding, such as applying statistical functions to the standard encoding. For example, Unicode may indicate character specific information for the text string allowing features of the alphanumeric characters within the text string to be differentiated and identified. An applied statistical function may be at least one of a mean function, a minimization function, a maximization function or the like.

The data vector component 233 may use different techniques to identify features of the individual alphanumeric characters in each respective encoded text string. For example, the data vector component 233 may be operable to process a respective encoded text string based on locating edges between letters, a group of multiple numbers in serial, a group of letters in serial, or the like. The data vector component 233 may apply different types of filters, such as a statistical filter, a convolution filter, a triplet filter windowing function, or the like, to the text string to identify features of the alphanumeric characters. In a specific example, a convolution filter of a 1 by 2 with filter values such as [+1, −1], may be applied to the text string. Of course, other filters and filter values may be used.

In addition, the identified features may be weighted based on the position of the feature within the text string. For example, the weights prioritize the beginning, middle and end of a word in the text string and also enable text strings with common letter features to be differentiated from one another, thereby increasing the granularity of the data vector (e.g., from a coarse vector to a fine vector). For example, the data vector component 233 may process a respective text string of the number of respective text strings to adapt the text string to the preset data length in bits or bytes, such as 24, 32, 48, 128 or the like.

Feature data, such as an indication (e.g., a flag, a unique value of bits or the like) of whether a letter adjacent to a number, a number adjacent to a letter, a letter surrounded by characters of a different category, or triplets of a character of the same category, two characters of the same category adjacent to characters of a different category, or the like, may be extracted based on the identified features and applied weightings. A data vector may be generated for the respective text string by populating the data vector with the extracted feature data (e.g., in the form of a number of bits indicating the identified features) of the respective text string. This is an example of at least one process for generating a data vector for each respective text string.

The data quality monitoring component 230 may determine a respective data vector category for each respective data vector (330). A data vector category may, for example, be based on the feature data included in each respective data vector. A data vector category may be a category is an upper-case letter, a lower-case letter, a punctuation mark, a Roman letter, an Arabic letter, a number, a special character (e.g., @, &, %, $, or the like), a space, an outlier, or the like. In some examples, a data type may also be a data category. In an example, the data vector component 233 of the data quality monitoring component 230 in the FIG. 2 example, may be operable to perform functions for each respective text string.

For example, a data vector component 233 may access a collection of data vector category definitions, wherein each data vector category definition includes a plurality of features that define the data vector category. For each respective data vector, the data vector component may compare the feature data of the respective data vector to at least one data vector category definition (described in more detail with reference to other examples) in the collection of data vector category definitions. Based on a result of the comparison a similarity rating between the feature data of the respective data vector and the at least one data vector category definition in the collection may be determined. The determined similarity rating may be a value less than 1.0 or the like, such as 0.80, 0.90 or 0.96, or a range of values less than 1.0, such as 0.85-0.95 or the like. the at least one data vector category definition in the collection that produced a highest determined similarity rating may be selected as the data vector category definition for the respective data vector. Upon selecting the data vector category definition for the respective data vector, the data vector component 233 may proceed to determining a respective category for a next respective data vector, if available.

In some examples, processes other than using a similarity rating may be used to determine a respective data vector category of step 330. For example, when determining a respective category for each respective data vector, the respective data vectors in the dataset may be processed with respect to one another using a machine learning algorithm, such as an isolation forest algorithm or supervised machine learning models, which may be a classification model like a neural network, random forest or the like. For example, the processing of respective data vectors in the dataset may include comparing the respective data vectors to one another according to the machine learning algorithm. Based on an output of the machine learning algorithm, one or more respective data vectors may be categorized as an outlier. A respective data vector is categorized as an outlier when the feature data of the respective data is substantially different based on a similarity threshold from the feature data of a majority of other respective data vectors in the dataset. After categorizing the one or more respective data vectors of the dataset as outliers, the other respective data vectors may be categorized as normal or as some other category (e.g., address, surname or the like) that indicates the other respective data vectors are not outliers. wherein the alert is generated in response to the number of data vectors that are assigned to a data vector category indicating a data vector is an outlier exceeds the predetermined outlier threshold value.

In an alternative example of when a respective category for each respective data vector is determined at 330, the machine learning algorithm may be a clustering algorithm. For example, the machine learning component 235 of FIG. 2 may be operable to, instead of identifying outliers in the data vectors from the dataset, process the respective data vectors in the dataset with respect to one another. The processing of processing the respective data vectors in the dataset with respect to one another enables the data quality monitoring component 230 to categorize the respective data vector based on a cluster in which the clustering algorithm indicated the respective data vector belonged.

Upon determining a respective data vector category for each respective data vector, the data vector component 233 may assign the determined respective category respective data vector to each respective data vector (340).

At 350, the quality evaluation component 237 may, for example, evaluate the dataset based on each respective data vector category assigned to each respective data vector. The quality evaluation component 237 may further, at 360, determine whether the dataset satisfies a data quality metric in response to a result of the evaluation of the dataset.

It may be helpful to explain an alternate process flowchart that includes some of the alternate steps performed by elements shown in FIGS. 1 and 2. The process 400 of FIG. 4 illustrates a flow chart of another example of a process for processing and evaluating the quality of a monitored dataset. In the example of FIG. 4, a processor or processors, such as 242 of FIG. 2, may execute programming code stored in either the memory 244 or one or more storage device(s) 246.

At 410, the processor may receive a dataset with a number of variable length character strings. The processor may process each of the number of variable length character strings separately either serially or in parallel. The processor may perform a number of functions or processes for each respective variable length character string in the number of variable length character strings. For example, the processor, at 420, may obtain a respective variable length string from the number of variable length strings. At 430, the processor may compute a number of features of the respective variable length character string. For example, computed features may include at least one of a percentage of elements in the character string are in a specific category, a number of edges between letters, a group of numbers in serial, a group of letters in serial, or the like. An edge, for example, may be determined to be located between an end of a first character and a start of a second character, as the end of all characters, as the start of all characters, or the like.

The processor may capture attributes of the respective variable-length character string based on the number of computed features (440). In an example, a captured attribute may be identified as a letter adjacent to a number, a number adjacent to a letter, a letter surrounded by characters of a different category, or triplets of a character of the same category, two characters of the same category adjacent to characters of a different category, or the like.

When the attributes are captured, the processor upon executing the programming code may populate a data vector with the captured attributes. In an example, the data vector has a predetermined length and includes one or more of the captured attributes of the respective variable-length character string. The processor may further determine if the last variable length string in the dataset has been processed at 460. If the determination is "NO," the last variable length string in the dataset has not been processed, the process 400 proceeds to 465 and the next respective variable length text string is obtained, and steps 420-460 are repeated. However, if the determination at 460 is "YES," the last variable length string in the dataset has been processed, the process 400 may proceed to 470. At 470, the processor may assign a category to each respective data vector using a machine learning algorithm. For example, the machine learning algorithm may be a neural network, a clustering algorithm, a linear regression function, k-means, random forest, isolation forest, or the like. As mentioned above, a category may be at least one of an upper-case letter, a lower-case letter, a Roman letter or character, an Arabic letter or character, a number, a punctuation mark, a special character, a space, an outlier, emojis, mathematical symbols, characters, such as Asian language characters, or the like.

At 480, the processor may evaluate the dataset based on the category assigned to each respective data vector. In response to a result of the evaluation of the category assigned to each respective data vector, the processor may determine whether the dataset satisfies a data quality metric (490). A data quality metric for one or more of the datasets may include a percentage of data vectors assigned to an outlier category that is greater than an outlier threshold percentage, or the like. For example, the dataset may fail to exceed the number of data vectors assigned to a specific category that corresponds to a data source that provided the dataset. Alternatively, the processor may determine that a percentage of data vectors assigned to a particular data vector category, such as an outlier data vector category, exceeded a predetermined percentage threshold, such as an outlier data vector threshold. As a result, the dataset failed to satisfy the quality metric. Alternatively, the processor may determine the dataset did satisfy the quality metric because the percentage of data vectors assigned to a particular data vector category or categories, such as letters (by itself) or, in combination with another data vector category, such as a number, exceeded a predetermined percentage threshold, such as combined percentage threshold of letters and numbers (e.g., 67%), or a letters only percentage threshold (e.g., 85%).

In addition, in response to a determination that the dataset fails to satisfy the data quality metric, an alarm may be generated by the processor. The generated alarm may be forwarded to a client device, such as client device 240 of FIG. 2 or client system 135 of FIG. 1 (that may include client devices, such as 240) with a report indicating how the dataset failed to satisfy the data quality metric and a link to the dataset. The client device may use the generated alarm to report how the dataset failed to satisfy the data quality metric and provide a link to the dataset that caused the alarm to be generated.

As mentioned, an apparatus, component or system as described above may include hardware and software components implemented in a computing architecture of a computing device. It may be helpful to provide an example of a suitable computing architecture.

Figure 5:
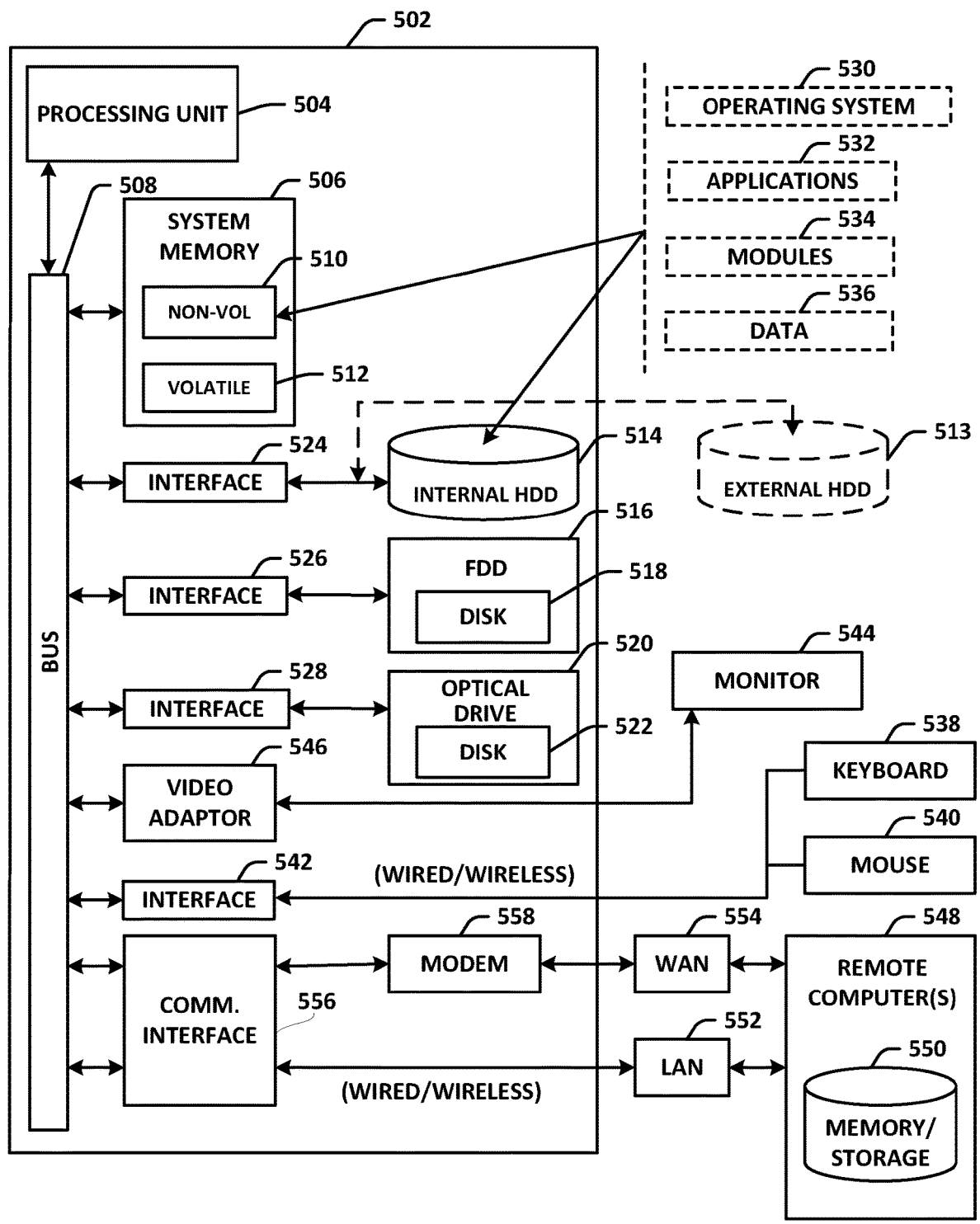
FIG. 5 illustrates an example of a computing architecture suitable for implementing the examples illustrated in FIGS. 1-4.

FIG. 5 illustrates an example of a computing architecture 500 suitable for implementing various examples as previously described. In one example, the computing architecture 500 may include or be implemented as part of system 100 or the data quality monitoring apparatus 200.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal.

Further examples, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 500.

As shown in FIG. 5, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated example shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal hard disk drive (HDD) 514 (or external hard disk drive (HDD) 513), a magnetic floppy disk drive (FDD) 516 to read from or write to a removable magnetic disk 518, and an optical disk drive 520 to read from or write to a removable optical disk 522 (e.g., a CD-ROM or DVD). The HDD 514 or 513, FDD 516 and optical disk drive 520 can be connected to the system bus 508 by an HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of computer program modules can be stored in the drives and memory 510, 512, including an operating system 530, one or more application programs 532, other program modules 534, and program data 536. In one example, the one or more application programs 532, other program modules 534, and program data 536 can include, for example, the various applications and/or components of the computing architecture 500.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through an interface, such as input device interface 542, that is coupled to the system bus 508 but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically includes many or all the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554 or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-4 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

As mentioned in the discussion of FIG. 2, the data quality monitoring component 230 may include a machine learning component 235. The machine learning component 235 may include processing component, logic circuits, field programmable gate arrays or the like that is configured to implement a machine learning algorithm such as those described above with reference to the examples of FIGS. 1, 3 and 4.

Figure 6:
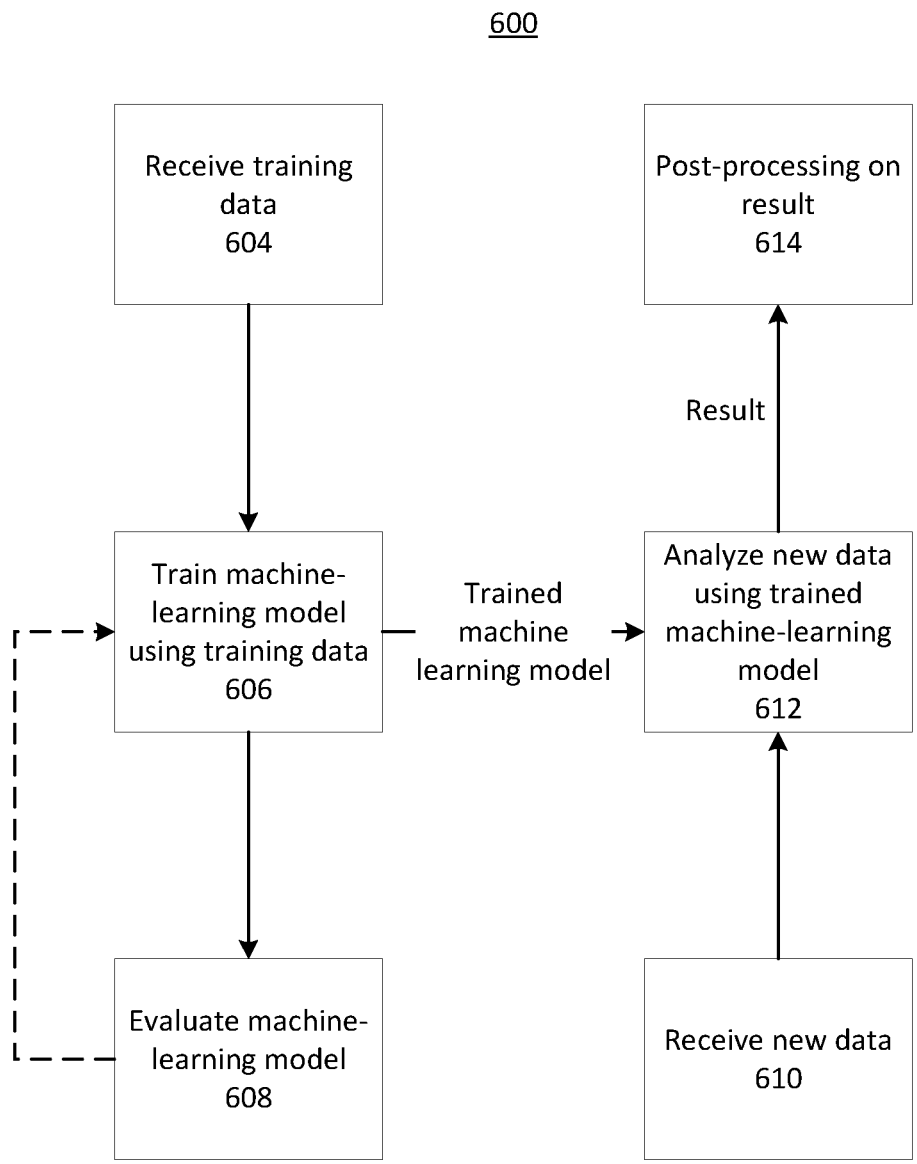
FIG. 6 is a flow chart of an example of a process for generating and using a machine-learning model according to some aspects of the data quality monitoring examples of FIGS. 1-4.

FIG. 6 is a flow chart of an example of a process for generating and using a machine-learning model according to some aspects of the data quality monitoring examples of FIGS. 1-4.

Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to FIG. 6, which is a flowchart of an example of a process for training and using a machine-learning model according to some aspects of the foregoing examples.

The process 600 includes several steps, for example, in block 604, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In examples, the training data may include transaction information, historical transaction information, and/or information relating to the transaction. The transaction information may be for a general population and/or specific to a user and user account in a financial institutional database system.

In block 606, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 608, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, e.g., the current transaction information, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a task, the process can return to block 606, where the machine-learning model can be further trained using additional training data or otherwise modified to improve accuracy. If the machine-learning model has an adequate degree of accuracy for the task, the process can continue to block 610.

In block 610, new data is received. In some examples, the new data is received from a remote database or a local database, constructed from various subsets of data, or input by a user. The new data may be unknown to the machine-learning model. For example, the machine-learning model may not have previously processed or analyzed the new data. In some examples, the new may be provided to the process at 604 for use as training data.

In block 612, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 614, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

At least one computer-readable storage medium may include instructions that, when executed, cause a system to perform any of the computer-implemented methods described herein.

Some examples may be described using the expression "one example" or "an example" along with their derivatives. These terms mean that a particular feature, structure, or characteristic described in connection with the example is included in at least one example. The appearances of the phrase "in one example" in various places in the specification are not necessarily all referring to the same example. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more examples. Rather, the operations are machine operations.

Some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

As used in this application, the terms "system" and "component" are intended to refer to a computer-related entity, either hardware, a combination of hardware and software, software, or software in execution, examples of which are provided by the examples in FIGS. 1-5. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server or processor and the server or processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Various examples also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. A method, comprising:
   identifying a plurality of text strings of alphanumeric characters in a dataset, wherein each respective text string has an arbitrary length and is encoded according to an encoding standard;
   generating a data vector for each respective text string, wherein the generated data vector has a preset data length and includes feature data indicating features of the respective text string;
   determining a respective data vector category for each respective data vector, wherein a data vector category is based on the feature data included in each respective data vector;
   assigning each respective data vector to the respective data vector category determined for the respective data vector;
   evaluating the dataset based on each respective data vector category;
   in response to a result of the evaluation of the dataset, determining whether the dataset satisfies a data quality metric;
   in response to the data set failing to satisfy the data quality metric, generating an alarm; and reporting how the dataset failed to satisfy the data quality metric and provide a link to the dataset that caused the alarm to be generated.

2. The method of claim 1, wherein generating a data vector for each respective text string, comprises:
for each respective text string:
applying a statistical function to the respective text string to conform the text string to the preset data length;
identify, by applying a filter to the respective text string, features of the alphanumeric characters in the respective text string based on the encoding of the respective text string according to the encoding standard;
applying weightings to the identified features of the alphanumeric characters in each respective text string based on a position of each feature within the respective text string;
extracting feature data based on an output of the applied filter and applied weightings; and
generating the data vector for the respective text string by populating the data vector with the extracted feature data of the respective text string.

3. The method of claim 2, wherein the applied statistical function includes at least one of a mean function, a minimization function, or a maximization function.

4. The method of claim 2, wherein the applied filter includes at least one of a convolution filter or a triplet filter windowing function.

5. The method of claim 1, wherein determining whether the dataset satisfies the data quality metric comprises:
determining that a percentage of data vectors assigned to a particular data vector category exceeded a predetermined percentage threshold.

6. The method of claim 5, further comprising:
in response to the dataset failing to satisfy the data quality metric, generating an alert, wherein the data quality metric is a predetermined outlier threshold value for a number of data vectors being assigned to a data vector category indicating a data vector is an outlier; and
forwarding the generated alert to a client device for corrective action,
wherein the alert is generated in response to the number of data vectors that are assigned to a data vector category indicating a data vector is an outlier exceeds the predetermined outlier threshold value.

7. The method of claim 1, wherein determining a respective category for each respective data vector comprises:
accessing a collection of data vector category definitions, wherein each data vector category definition includes a plurality of features that define the data vector category; and
for each respective data vector:
comparing the feature data of the respective data vector to at least one data vector category definition in the collection of data vector category definitions;
based on the comparison, determining a similarity rating between the feature data of the respective data vector and the at least one data vector category definition in the collection; and
selecting the at least one data vector category definition in the collection that produced a highest determined similarity rating.

8. The method of claim 1, wherein determining a respective category for each respective data vector comprises:
processing the respective data vectors in the dataset with respect to one another using a machine learning algorithm;
based on an output of the machine learning algorithm, categorizing one or more respective data vectors as outliers, wherein a respective data vector is categorized as an outlier when the feature data of the respective data is substantially different based on a similarity threshold from the feature data of a majority of other respective data vectors in the dataset; and
after categorizing the one or more respective data vectors of the dataset as outliers, categorizing the other respective data vectors as normal.

9. The method of claim 1, wherein determining a respective category for each respective data vector comprises:
processing the respective data vectors in the dataset with respect to one another using a machine learning algorithm, wherein the machine learning algorithm is a clustering algorithm; and
for each respective data vector:
categorizing the respective data vector based on a cluster in which the clustering algorithm indicated the respective data vector belonged.

10. A system, comprising:
a data source, wherein the data source outputs a dataset related to a service and the dataset includes a plurality of text strings of arbitrary length and that are encoded according to an encoding standard;
at least one database coupled to the data source and operable to store the dataset output by the data source; and
a data quality monitoring component coupled to the data source and operable to perform functions, including functions to:
receive the dataset including the plurality of text strings of arbitrary length from the data source;
generate a data vector for each respective text string of the plurality of text strings, wherein the generated data vector has a preset data length and includes feature data indicating features of the respective text string;
determine a respective data vector category for each respective data vector, wherein a category is based on the feature data included in each respective data vector;
evaluate the dataset based on each respective data vector category;
in response to evaluating the dataset, determine whether the dataset satisfies a data quality metric;
in response to the data set failing to satisfy the data quality metric, generate an alarm; and
report how the dataset failed to satisfy the data quality metric and provide a link to the dataset that caused the alarm to be generated.

11. The system of claim 10, wherein the data quality monitoring component is further operable to perform functions, including functions to:
assign each respective data vector to the respective category determined for the respective data vector.

12. The system of claim 10, wherein the data quality monitoring component further comprises a data vector component, the data vector component operable to perform functions to:
for each respective text string:
process the respective text string to adapt the text string to the preset data length;
identify features of alphanumeric characters in the respective text string based on the encoding of the respective text string;

applying weightings to the identified features based on a position of each feature within the respective text string;

extracting feature data based on the identified features and applied weightings; and generating the data vector for the respective text string by populating the data vector with the extracted feature data of the respective text string.

13. The system of claim 12, wherein the data vector component, when identifying features of the alphanumeric characters in the respective text string, is further operable to perform functions to:

identify occurrences in the text string where a letter is adjacent to a number, a number is adjacent to a letter, a letter is surrounded by letters of a different type, triplets of a data element of the same type, or two numbers or letters of the same type are adjacent to letters or numbers of a different type, wherein a type of letter or number is an upper-case letter, a lower-case letter, a Latin character, or an Arabic character.

14. The system of claim 12, wherein the data vector component, when identifying features of the alphanumeric characters in the respective text string, is further operable to perform functions to:

identify a feature based on locating edges between letters, a group of multiple numbers in serial, or a group of letters in serial.

15. A non-transitory computer readable medium embodying programming code that when executed by a processor causes the processor to perform functions, including functions to:

receive a dataset with a plurality of variable length character strings;

for each respective variable length character string in the plurality of variable length character strings:

compute a plurality of features of the respective variable length character string;

capture attributes of the respective variable length character string based on the plurality of computed features;

populate a data vector with the captured attributes, wherein the data vector has a predetermined length and includes one or more of the captured attributes of the respective variable length character string;

assign a category to each respective data vector using a machine learning algorithm;

based on the category assigned to each respective data vector, evaluate the dataset; and in response to evaluating the dataset based on the category assigned to each respective data vector, determine whether the dataset satisfies a data quality metric.

16. The non-transitory computer readable medium of claim 15, further comprising programming code that when executed by a processor causes the processor to perform functions, including functions to:

in response to a determination that the dataset fails to satisfy the data quality metric, generate an alarm; and device forward the generated alarm to a client with a report indicating how the dataset failed to satisfy the data quality metric and a link to the dataset.

17. The non-transitory computer readable medium of claim 15, wherein:

a category is at least one of an upper-case letter, a lower-case letter, a punctuation mark, a Roman letter, an Arabic letter, a number, a punctuation mark, a special character, a space, or an outlier, and the computed features include at least one of a percentage of elements in the character string are in a specific category, a number of edges between letters, a group of numbers in serial, or a group of letters in serial.

18. The non-transitory computer readable medium of claim 15, wherein an edge is determined to be located between an end of a first character and a start of a second character.

19. The non-transitory computer readable medium of claim 15, wherein a captured attribute is further identified as a letter adjacent to a number, a number adjacent to a letter, a letter surrounded by characters of a different category, or triplets of a character of the same category, two characters of the same category adjacent to characters of a different category.

20. The non-transitory computer readable medium of claim 15, wherein the data quality metric is one of:

the dataset includes a percentage of data vectors assigned to an outlier category that is greater than an outlier threshold percentage, or the dataset fails to exceed a number of data vectors assigned to a specific category that corresponds to a data source that provided the dataset.

* * * * *